United States Patent Office.

HENRY V. DUNHAM, OF NEW YORK, N. Y., ASSIGNOR TO CASEIN COMPANY OF AMERICA, A CORPORATION OF NEW JERSEY.

INSOLUBLE CASEIN AND PROCESS OF PRODUCING SAME.

SPECIFICATION forming part of Letters Patent No. 695,198, dated March 11, 1902.

Application filed September 28, 1901. Serial No. 76,864. (No specimens.)

*To all whom it may concern:*

Be it known that I, HENRY V. DUNHAM, a citizen of the United States, residing at New York, in the county of New York and State of New York, have invented or discovered certain new and useful Improvements in Insoluble Casein and Processes of Producing Same, of which the following is a specification.

As is very well known, many experiments have been conducted in the past with casein for the purpose of rendering it insoluble and of such a character that it may be used in the arts as a substitute for egg or blood albumen. To this end various attempts have been made to make the casein of a suitable insoluble character by the use of formaldehyde; but these attempts have not been satisfactorily successful for the reason that the casein solutions as heretofore treated with formaldehyde became insoluble too quickly, unless they were in a very dilute form, and in any event the resulting products were not of such a character as to be suitable for the purpose referred to. Consequently it has never heretofore been practicable to use casein solutions treated with formaldehyde as substitutes for egg and blood albumen where heavy solutions were required—as, for example, in calico-printing and for other purposes.

I have discovered, however, that by treating a casein solution with hexamethylene-tetramine and subsequently drying out the solution on a cloth or otherwise to form a thin sheet or film and then steaming the casein sheet or film at a temperature of 180° or above or by subjecting it to a weak solution of hot acids (preferably boracic acid) such casein sheet or film is rendered insoluble and the product is of such a character as to be suitable for use as a substitute for egg or blood albumen coagulated by heat, this substitute, however, being produced at very much less cost than the albumens referred to.

In practicing my invention or discovery I take about eighty-five (85) parts of ordinary commercial casein and add thereto about fifteen (15) parts of borax or equivalent of some other metallic salt having an alkaline reaction, and the mixture is then dissolved in about four hundred (400) parts of water. To this mixture is added about fifteen (15) parts of hexamethylene-tetramine. These proportions are all by weight. Any desired pigments for the purpose of coloring or inert material may be added to the resulting mixture, if desired. The solution is then dried out in any suitable way in the form of a film or it may be dried out by pressing the mixture into the meshes of a cloth and allowing it to dry in the form of a thin sheet. When the sheet or film is dried, either on a cloth or in any other manner, it is subjected to steam under a pressure of about five (5) pounds per square inch and at a temperature of 180° or above for about half an hour, and owing to this treatment it is rendered insoluble, or instead of subjecting the casein film to steam it may be rapidly run through a hot five-per-cent. solution of acid (preferably boracic acid) heated to 180° or somewhat higher and is by this treatment rendered insoluble.

I do not wish to be understood as limiting my invention or discovery to the exact proportions hereinbefore stated, as these may be varied somewhat without materially altering the result at which I am aiming—to wit, an insoluble casein product of such a character that it may be used in the arts as a substitute for insoluble egg or blood albumen.

Having thus described my invention or discovery, I claim and desire to secure by Letters Patent—

1. The herein-described insoluble casein product, suitable for use as a substitute for albumen, the same consisting of a mixture of commercial casein, a salt with an alkaline reaction, and hexamethylene-tetramine, in substantially the proportions specified.

2. The herein-described insoluble casein, suitable for use as a substitute for albumen, the same consisting of a mixture of commercial casein, borax, and hexamethylene-tetramine, in substantially the proportions specified.

3. The herein-described process for producing insoluble casein, consisting in dissolving a mixture of casein and a metallic salt, with an alkaline reaction, in water, then adding hexamethylene-tetramine to the solution, then drying out the solution and subsequently subjecting the dried-out product to heat and moisture.

4. The herein-described process for producing insoluble casein, consisting in adding about fifteen parts of borax to about eighty-five parts of ordinary commercial casein, then dissolving the mixture in about four hundred parts of water, then adding to the solution about fifteen parts of hexamethylene-tetramine, then drying out the solution, and subsequently subjecting the dried-out product to heat and moisture.

In testimony whereof I affix my signature in presence of two witnesses.

HENRY V. DUNHAM.

Witnesses:
  HENRY S. HOPKINS,
  CHAS. J. TABER.